United States Patent [19]

Basham et al.

[11] 4,345,480
[45] Aug. 24, 1982

[54] ROTARY FLOW METER

[76] Inventors: Edward R. Basham, 4125 Driskell, Fort Worth, Tex. 76107; Helmut R. M. Cmelik, 9008 Ridglea Country Club Dr., #301, Fort Worth, Tex. 76126

[21] Appl. No.: 147,634

[22] Filed: May 7, 1980

Related U.S. Application Data

[63] Continuation of Ser. No. 879,254, Feb. 21, 1978, abandoned.

[51] Int. Cl.³ .............................................. G01F 1/115
[52] U.S. Cl. .............................. 73/861.77; 73/861.83; 73/861.94; 73/155
[58] Field of Search ........... 73/861.77, 861.79, 861.89, 73/861.94, 861.83, 155; 340/606

[56] References Cited

U.S. PATENT DOCUMENTS

| | | | |
|---|---|---|---|
| 2,962,895 | 12/1960 | Rumble | 73/861.77 X |
| 3,039,302 | 6/1962 | Willis | 73/861.89 X |
| 3,680,378 | 8/1972 | Aurilio et al. | 73/861.83 X |
| 3,729,996 | 5/1973 | Metz | 73/861.77 |
| 3,771,362 | 11/1973 | Roberts | 73/861.77 |
| 3,922,525 | 11/1975 | Kozak | 73/861.77 X |

Primary Examiner—Herbert Goldstein

Attorney, Agent, or Firm—Hubbard, Thurman, Turner, Tucker & Glaser

[57] ABSTRACT

An impeller is rotatably mounted in a housing on the lower end of a sub which is lowered by means of a wire line into a bore hole. The fluid flow in either direction within the bore hole engages and rotates helical vanes of the impeller, which in turn rotates a digital sensing device. A magnetic coupling links the impeller to the sensing device which is sealably secured within the housing. Rotation of the sensing device in one direction produces a digital output signal which is distinguishable from the output signal produced when the sensing device is rotated in the opposite direction. The digital signal is produced by the rotation of a butterfly valve between signal emitter elements and signal receiving elements coupled to a distinguishing logic circuit. The direction of flow of fluids along the bore hole is thus easily detected in a reliable, highly sensitive manner. Further, and regardless of the direction of rotation of the sensing device, a third discrete output signal is produced, which is indicative of the rate of flow of fluid within the bore hole independent of the direction of that flow. Because of the low friction operation of the meter, the threshold velocity of detectable fluid flow is extremely low.

6 Claims, 6 Drawing Figures

U.S. Patent  Aug. 24, 1982  4,345,480
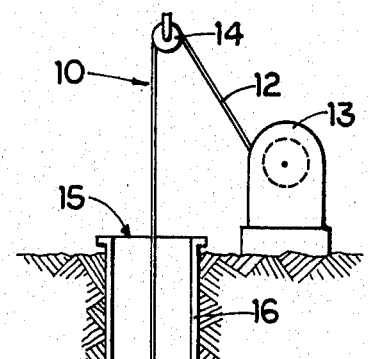
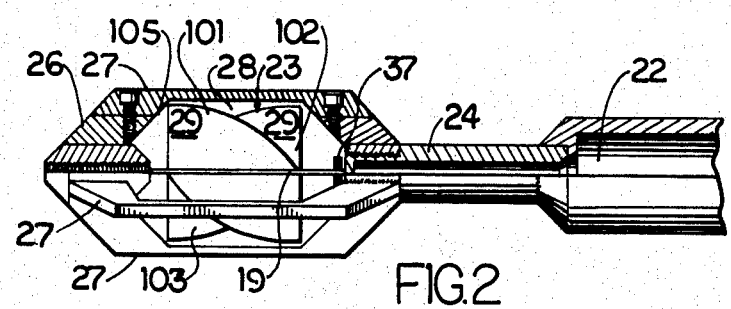
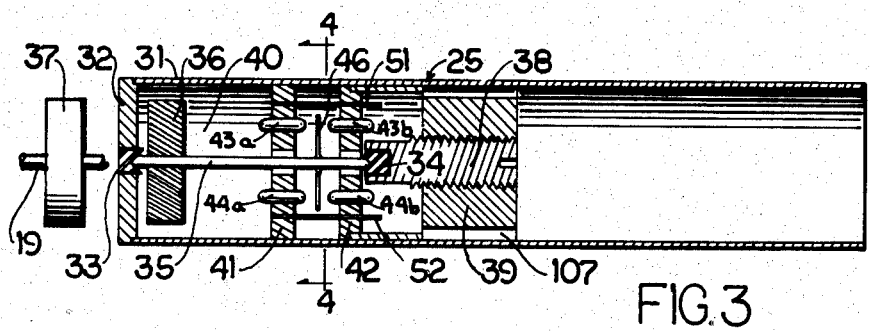
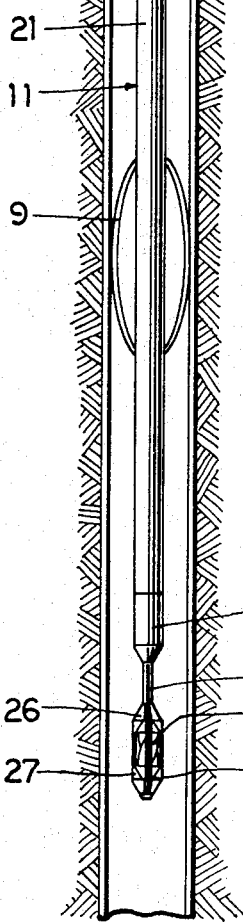
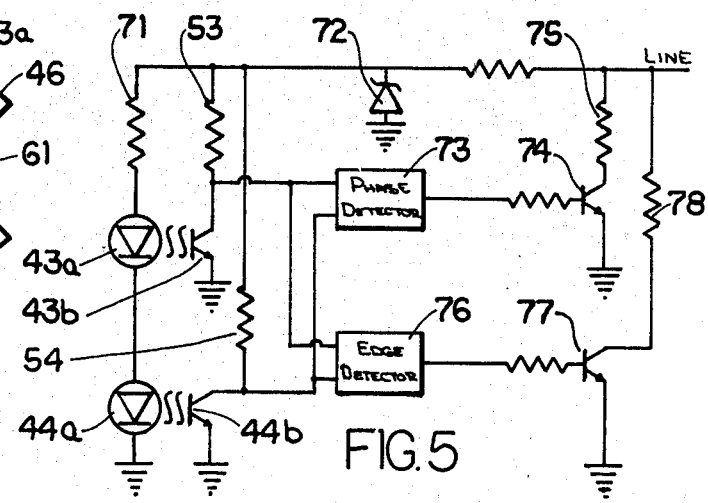
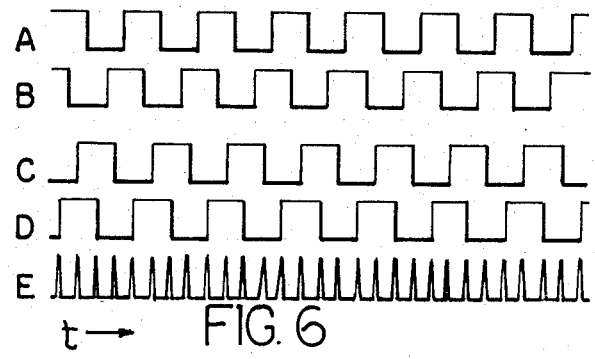

ROTARY FLOW METER

This application is a continuation of copending application Ser. No. 879,254, filed Feb. 21, 1978, now abandoned.

BACKGROUND OF THE INVENTION

The invention relates to bore hole flow meters, and in particular, to a rotary bore hole flow meter which accurately detects and digitally interprets both the direction and the rate of fluid flow within the bore hole.

In the extraction of oil and other petroleum products from the earth, a bore hole is drilled down through multiple strata of earth. The bore hole is conventionally lined with a tubular casing which is selectively perforated to provide communication between oil producing strata and the bore hole. Fluids are conducted from the lower open end of the tubing, back up the bore hole to the surface. In a conventional well, it is desirable to be able to measure the rate of flow of the fluid and the direction of flow thereof by use of a tool which can be temporarily lowered into the bore hole to make such measurement.

In certain other types of petroleum production, a technique known as "water flooding" is employed, wherein water is pumped through a first bore hole to enter surrounding earth strata or formations and force oil contained in the strata into an adjoining producing well. That is, in petroleum production, fluids are forced both into subterranean formations and withdrawn from subterranean formations from various bore hole locations. Consequently, it is desirable to have a means for measuring, downhole, both the direction of flow as well as the rate of flow of fluids within the bore hole. It is preferred to have a simple and accurate flow meter which may be lowered into the bore hole at different depths and which will indicate both the direction and the rate of the flow of the fluids therein.

Prior art flow meter tools for boreholes have included devices for use in well bores with and without packers. Such flowmeters generally include a passageway open at inlet and outlet orifices to the exterior of the tool and a spinner section which measures the rate of fluid flow through the passageway. In a packer-type flowmeter, the horizontal cross section of the well bore, say seven inches in diameter, is packed off and the entire fluid flow is directed through the tool for fairly low rates of flow therein sampling the flow.

In a typical flowmeter spinner section, a spinner is rotated under the influence of the fluid flow at an angular velocity proportional to the velocity of the fluid flow, and the rotation is directed by a sensing system to provide an indication of the velocity of fluid flow. In the typical spinner assembly, particularly for low rates of fluid flow, it is difficult to physically mount the spinner for perfectly free rotation and to detect the true angular velocity of the spinner to provide accurate indications because of friction forces and other retarding forces in the assembly. Such retarding forces include spinner bearing resistance as well as sensor inertial and functional resistances.

Certain problems in prior art flowmeters are the results of the aforesaid resistance aspects of the tool. For example, it is desirable to detect very low fluid velocities in the range of ten to twenty feet per minute. Moreover, the use of packers is not always feasible or practical. Flow meters utilizing spinners or similar propeller structures having low performance efficiency may critically reduce the sensitivity of the tool. Flowmeter sensor units incorporating conventional magnetic pick-up units may also adversely affect sensitivity through start up torque and inertial resistance. Additionally, most prior art sensor units utilize a basic analog signal network which is sensitive to changes in temperature and subject to undiagnosed component error or failure; with low fluid velocities and/or related turbulence in the borehole, signal errors can be critical to proper logging operations and detection of fluid flow direction as well as flow rate.

It is equally important to detect and monitor fluid flow direction with equal sensitivity and accuracy. Many prior art units discriminate between analog signals to distinguish direction; but spinner efficiency, bearing resistance and component eror can render ineffective proper downhole monitoring of direction, as well as rate. In packerless designs, such factors as laminar flow conditions can alter flow reading accuracy, particularly between opposing flow directions. For example, a laminar flow condition will exist from a downward flow from the tool string to the spinner or related propeller element. The same condition will not exist in an upward flow. With the added sensitivity, fluctuations due to temperature and end loading resistance on certain prior art constructions, low or erratic fluid flow can remain undetected or recorded with any degree of accuracy.

It would be an advantage therefore, to overcome the aforesaid problems and disadvantages of prior art flowmeters. The flowmeter apparatus of the present invention is provided in a highly sensitive and reliable configuration which permits the detection and digital sensing of borehole fluid flow. A spinner structure is provided in an impeller configuration having helical vanes disposed therearound. The impeller is magnetically coupled to a digital sensing unit, incorporating a sealed optical chopper having virtually zero functional resistance as compared to magnetic flux sensors. In this manner, a flow meter is provided, having extremely low and accurate threshhold velocity detection capabilities.

SUMMARY OF THE INVENTION

The present invention comprises a rotary flow meter tool for use in bore holes which is both sensitive, highly reliable, and effective in indicating the direction and the rate of fluid flow within the bore hole. In accordance with the broader aspects of the invention, a flow meter includes an impeller, mounted for rotation about a normally vertically disposed axis and having a plurality of generally axially extending helical rotor blades. The impeller is magnetically coupled to rotate the shaft of a sensing unit which produces a discrete output when the propeller is being rotated in one direction, a different output signal if the propeller is being rotated in the opposite direction, and a third digital output signal indicative of the rate of rotation of the propeller regardless of the direction of rotation. This configuration permits the detection of extremely low flow velocities and direction in a highly reliable manner.

In accordance with more specific aspects of the invention, the detecting apparatus includes signal emitter and receiver elements, separated by a butterfly valve, which upon rotation produces a discrete digital signal output. The signal emitter and receiver includes two pairs of light source/light detector arrays. Each of the two arrays or sets of light source/light detector elements is located on the circumference of a circle having as its center the axis of rotation of a detector shaft magnetically coupled to the impeller. The two light source/light detector sets are also positioned along the radii of the circle having a preselected angle therebetween. The butterfly valve is positioned on the detector for rotation thereon and includes a generally circular plate having discrete segments removed from the outer periphery in a preselected pattern. Upon rotation of the plate, a portion of the periphery remaining periodically breaks the light path between each of the two light source/light detector circuits and periodically permits the light to pass between the sets when the plate is positioned such that the removed segment is between the light/detector pairs. The angular position of the light source/light detector pairs from one another in combination with the rotating plate, cause the two light detectors to produce one electrical signal when the plate is being rotated in one direction, a different electrical signal when the plate is being rotated in the other direction, and a third signal which varies with the rate of rotation of the plate regardless of its direction. This construction is assembled in a sealed housing with virtually zero rotational resistance, since only light is being "chopped" by the butterfly valve.

BRIEF DESCRIPTION OF THE DRAWINGS

A more complete understanding of the invention can be had by reference to the following detailed description when taken in conjunction with the accompanying drawing wherein:

FIG. 1 is a side elevational cross sectional view of a well logging system utilizing one embodiment of a rotary flow meter, incorporating the principles of the present invention;

FIG. 2 is an enlarged, side elevational view of the impeller and housing of the rotary flow meter of the present invention;

FIG. 3 is a cut away schematic view of the sensor unit for detecting flow direction and rate;

FIG. 4 is a cross sectional view of the apparatus of FIG. 3, taken along the lines 4—4 thereof;

FIG. 5 is a circuit diagram of one embodiment of the flow direction and rate detecting circuitry of the present invention; and FIG. 6 is a series of wave form diagrams illustrating output from the circuitry of FIG. 5 under conditions of different flow directions.

DETAILED DESCRIPTION

Referring now to FIG. 1 of the drawing, there is shown one embodiment of a well logging system 10, utilizing a rotary flow meter tool 11 constructed in accordance with the principles of the present invention. The well logging system 10 includes a cable 12 extending from a drum 13 through a capstan 14 and into a depending bore hole 15. The wire line cable 12 is connected at its lower end to a rotary flow meter 11 of the present invention. The bore hole 15 includes a steel casing 16 which is generally of the type commonly associated with petroleum wells. The casing 16 will include perforations at selected locations along its length (not shown) to permit the communication of fluid flow between various strata surrounding the bore hole and the interior of the casing 16. Additionally, the casing 16 may also house a string of production tubing (not shown) having a substantially smaller diameter than the casing 16.

Still referring to FIG. 1, the rotary flow meter 11 of the present invention comprises an elongate cylindrical housing 21 having an intermediately disposed centralizing spring assembly 9. Beneath the spring 9, at the lower end of the housing 21, there is assembled an electronics housing section 22 and a lower, helically configured impeller 23 which rotates upon a shaft 19 as a function of fluid flow within the casing 16. A detector housing section 24 supports an outwardly disposed impeller 23, which is rotatably mounted thereon. The housing section 24 also contains the apparatus for detecting the direction and speed of rotation of the impeller 23. The signals from housing 24 are then communicated to the surface of the borehole for recording on a strip recorder, or the like (not shown).

Referring now to FIG. 2, the impeller 23 includes a generally cylindrical impeller cage 26, comprising a plurality of longitudinally extending curved ribs 27 disposed adjacent the detector housing section 24. The longitudinal ribs 27 may be formed separately and secured to the central body of the cage, as shown, or the structure may be cast of suitably strong material such as steel. The longitudinal ribs 27 are tapered at each end and each has an inward, intermediate portion removed to define a central impeller region 28. A plurality of helically configured impeller blades 29 are mounted within said central region 28 and interposed among the ribs 27. When the impeller 23 is subjected to fluid flowing in the general direction of its axis, said impeller is caused to rotate upon its shaft 19 between jewelled bearings at a speed in proportion to the rate of the flow and in a rotational direction indicative of the flow direction.

The impeller 23 is preferably constructed to respond to the smallest possible fluid flow within the casing 16. Therefore, the impeller 23 is formed with helical vanes, or blades 29, which are longitudinally secured to the shaft 19 in a configuration responsive to bidirectional fluid flow. Consequently the impeller blades 29 are secured upon shaft 19 in opposing sets. For example, the front end taper of a vane 101 is opposite that of a vane 102 and equivalent to a vane 103. Any number of vanes 29 can be utilized, although an array of four is illustrated herein. It should be noted that the utilization of the reversed vane array permits substantially equivalent sensitivity for opposing flow directions. Certain physical flow phenomena do, however, effect perfect sensitivity balancing in bidirectional flow. For example, laminar flow from the upper tool body 22 has a retarding effect on the rotation of the impeller 23 relative to actual fluid velocity. The present invention permits compensation for this phenomena by adjusting the spaced positioning between the lower ends of the vanes 29 relative to the lower end 105 of the ribs 27 of cage 26. Laminar fluid flow developed around the ribs 27, by being more closely disposed to the path of rotation of the vanes 29, will have a similar effect to laminar flow having its genesis from the upper tool body. In this manner, the impeller 23 may be flow balanced for bidirectional sensitivity by shifting its relative positioning within the case 26.

The detector housing section 24 is formed to house a sensor assembly 25 which comprises a housing 31, closed at its lower end by a plug formed of a material permeable to magnetic flux, such as brass. In operation, the sensor assembly 25 is secured within the housing 24 adjacent the impeller 23. As shown in FIG. 3 in the center of the circular plus 32, there is secured a bearing 33, preferably formed of a highly durable, low friction material such as a sapphire, or similar jewel as that disposed on the ends of shaft 19. A second jeweled bearing 34, is spaced from the first bearing 33 a distance along the central axis of the housing 31 and adjustably mounted upon a threaded support member 38 secured within a bulkhead 39. Between the two bearings 33 and 34 is an axially extending shaft 35. A disc 36 formed from a permanent magnet is rigidly fixed to the shaft 35 to rotate adjacent the magnetically permeable plug 32. Located on the opposite, outer side of the plug 32 in the assembled tool 11 is a second permanent magnet 37 which is affixed to the end of the impeller 23 on the shaft 19. Upon rotation of the magnetic disc 37, lines of magnetic flux will be coupled through the plug 32 to rotate the magnetic disc 36 in magnetically coupled engagement with the impeller 23.

Still referring to FIG. 3, the interior of the sensor assembly 25 also includes first and second plates 41 and 42 spaced one from the other. Mounted within the first plate 41 is a pair of signal emitters in the form of light sources 43a and 44a, which may be comprised of light emitting diodes (LEDS). The light sources 43a and 44a are located in the plate 41 along the circumference of a common circle, through the center of which passes the rotating shaft 35. Mounted within the second plate 42 is a pair of signal receiving elements in the form of photo sensitive devices 43b and 44b. The photo detector 43b is in axial alignment with the light source 44a. A generally flat interrupter plate comprising a butterfly valve 46 is mounted on the shaft 35 and rotates between the disc 41 and the disc 42. A pair of tubular conduits 51 and 52 are provided through which electrical leads may be easily run for interconnection with the light sources. Other electrical leads (not shown) are routed through an interconnection space 107 to communicate power and signal transmission with the upper electronic package 22 for communicating with the surface of the borehole 15.

The construction of the sensor unit or "optical chopper" 25 incorporates a sealable, low friction assembly, and the absence of heavy magnets and flux lines permits the utilization of an extremely low resistance sensor operation. Since there is no retarding effect from chopping light beams emitted by LEDS as compared to magnetically engaging flux lines, the sensor has virtually no effect on the impeller 23 relative to retarding the fluid induced rotation thereof.

Referring now to FIG. 4, there is shown an illustrative view of the interrupter plate 46 taken along the lines 4—4 of FIG. 3. As shown in FIG. 4, the interrupter plate 46 of the embodiment shown herein, comprises a generally circular plate having two segments removed from opposite sides thereof. The removed, or open segments define a generally circular inner region 61, the radius of which is less than the radial distance of each of the two light sources 43a and 44a from the axis of rotation of the shaft 35. The remaining portions of the interrupter plate 46 are comprised of diametrically opposed, interrupter segments 62 and 63. The outer periphery of the interrupter segments 62 and 63 extends a greater radial distance than the distance from the axis of rotation of the shaft 35 to each of the light sources 43a and 44a, respectively. Thus, it can be seen that when the interrupter plate 46 is positioned with respect to the light sources 44a and 43a as shown in FIG. 4, light will be blocked between light source 43a and light detector 43b (FIG. 3), while a portion of the light from light source 44a is permitted to pass to light detector 44b.

Therefore, as the interrupter plate 46 is rotated by the shaft 35, light is intermittently allowed to pass between light source 43a and light detector 43b, as well as light source 44a and light detector 44b. As shown most clearly in FIG. 4, the light sources 43a and 44a may be placed along circular radii, forming an angle of 135° with respect to one another. The radially extending sides which define interrupter segments 62 and 63 of the interrupter plate 46 are preferably located at an angle of 90° with respect to one another. Similarly, the radially extending edges defined by the portions removed from the interrupter plate 46 are also preferably positioned at 90° with respect to one another.

Referring next to FIG. 5, there is shown a diagram of one embodiment of circuitry used to detect the direction of rotation of the interrupter plate 46, and hence the direction of rotation of the impeller 23, as well as the rate of rotation thereof. FIG. 5 includes the two series connected LEDS 43a and 44a which are connected to an energizing voltage by means of a bias resistor 71. The source voltage is held at a fixed value by means of a zener diode regulator 72. The output of the associated photo transistors 43b and 44b are connected to the source voltage by means of biasing resistors 53 and 54. The output of photo transistor 43b and photo transistor 44b are also connected to the inputs of a phase detector circuit 73, the output of which is coupled through a driving transistor 74 to produce a voltage across the emitter resistor 75. The outputs of the photo transistors 43b and 44b are also connected to two inputs of an edge detector circuit 76 which is connected to a driver transistor 77 to produce an output voltage across a resistor 78.

Referring briefly to FIG. 6, there are shown six separate wave form diagrams A–E. Diagrams A and B show the output voltages of photo transistors 43b and 44b, respectively, during rotation of the impeller in one direction while wave forms C and D show the outputs of the photo transistors 43b and 44b during rotation of the impeller in the opposite direction. Wave form E of FIG. 6 illustrates the output of transistor 77 during rotation of the impeller in either direction, as will be defined in more detail below.

In operation, when the flow measurement meter 22 of the present invention 11 is positioned in a down hole configuration, fluid flow either up the casing 16 or down the casing 16 will cause the impeller 23 to rotate in one direction or the other. As shown in FIG. 2, impingement of fluid flow in a direction parallel to the axis of the impeller 23 moves the impeller blades 29 so as to rotate the impeller 23. As shown in FIG. 3, rotation of the impeller shaft 19 rotates the disc 37 which is magnetically coupled to the disc 36 and thereby rotates the interrupter plate 46 which is attached to the axially extending shaft 35. As is shown most clearly in FIG. 4, rotation of the interrupter plate 46 in the paths between light sources 43a and 44a and the light sensors 43b and 44b, respectively, causes an interruption in the flow of current from those light sensors 43b and 44b. The rate of interruption may be equated to fluid flow velocity, and easily interpreted. As can be seen from FIG. 4, rotation of the interrupter plate 46 about the axis 35 can also be related to flow direction. Rotation of the interrupter plate 46, for example, in a clockwise direction will allow light from LED 43a to pass to its associated photo cell 43b prior to allowing light to pass from LED 43s to photo detector 43b. Conversely, rotation of the interrupter plate 46 in a counter-clockwise direction, as shown in FIG. 4, will allow light to pass freely from LED 44a before light is permitted to pass from LED 43a. It may thus be seen that rotation of interrupter plate 46 in one direction allows photo detector 43b to conduct prior to photo detector 44b. Rotation of the plate 46 in the opposite direction allows photo transistor 44b to conduct prior to photo transistor 43b. That is, upon rotation of the interrupter plate 46, the output signals from photo transistors 43b and 44b will always be out of phase wih one another, with one signal leading the other during rotation in one direction and the same signal lagging the other during rotation in the opposite direction.

As is shown most clearly in FIG. 5, the outputs of the photo transistors 43b and 44b are each connected to the inputs of the phase detector 73. The output of the phase detector 73 is a function of which input signal is leading the other; thereby defining flow direction. By way of example, and with reference to both FIGS. 5 and 6, if wave form A represents the output of photo transistor 43b and wave form B represents the output of photo transistor 44b, the signal from photo transistor 43b is leading the output of photo transistor 44b. This "leading" condition will produce a distinct output from the phase detector 73, which output will be either high or low. If we next view wave form C as being the output of photo transistor 44b, this "lagging" condition will produce an output of the phase detector 73 of an opposite character to that of the "leading" condition (either high or low). Preferably, the circuitry is selected so that rotation of the interrupter plate 46 in a clockwise direction produces a high voltage output level while rotation in a counter clockwise direction produces a line voltage output of a low voltage level. The edge detector 76 detects the level change from photo transistor 43b and 44b and produces a pulse for each level transition. For example, in wave form E of FIG. 6, the circuitry is adjusted such that the leading and trailing edges of each of the wave forms C and D produces a spiked-like pulse. The pulses are accumulated and monitored as a function of the flow rate of the fluid past the impeller and hence, the rate of rotation of the interrupter plate 46.

The sensor unit of the detector housing 24 detects rotation of the impeller 23 with virtually minimum retardation and maximum reliability. The sensor utilizes a digital network as compared to the analog network of most prior art embodiments. For example, prior art flow meters utilizing magnetic signals consistently vary waveforms rather than producing discrete "on-off" pulses. Wave shape and amplitude thus become critical factors in logging operations, although such analog outputs are subject to undiagnosed component malfunction. For this reason, temperature compensating resistors are often used in prior art circuit designs to accommodate down hole conditions. In the present invention, such thermal elements are not needed because signal amplitude variations will not affect the digital output accuracy.

As can be seen from the above description, the invention provides a highly reliable and accurate means for electronically indicating both direction of flow in a down hole environment and the rate of that flow. Having thus described the invention in connection with certain specific embodiments thereof, it is to be further understood that modifications may now suggest themselves to those skilled in the art and it is intended to cover those modifications as fall within the scope of the following claims.

We claim:

1. An improved axial vane type flow meter for measuring the direction and rate of fluid flow within a borehole, comprising:
   an impeller means having a plurality of helical vanes mounted adjacent a sensing means for rotating in response to fluid flow;
   said impeller means including a cage freely suspended within said borehole with said vanes being axially positionable within said cage for rotation in closer proximity with one end of said cage than the other for engaging laminar fluid flow therefrom and balancing bidirectional sensitivity;
   said sensing means including two light paths and a light interrupter means for digitally sensing rotation and signalling both direction and rate of fluid flow of a duration imparting less than one revolution to said impellers;
   said sensing means being longitudinally disposed from said impeller in axial alignment therewith and sealably contained relative thereto and the fluid passing therearound; and
   a magnetic coupling connecting said impeller means to said sensing means through a first magnet coupled through a bulkhead to a second magnet to cause longitudinal separation between said impeller means and said sensing means and thereby provide virtually resistance free signal generation subject only to sensing means bearing resistance.

2. The flow meter of claim 1 wherein the shaft of said impeller means is independently mounted within said cage between a pair of jewelled bearings and communicates detected fluid flow to said sensing means through said magnetic coupling.

3. The flow meter as set forth in clam 1 wherein said light paths are provided by at least two light sources disposed in alignment with at least two light detectors with interruption of said light between each said light source and each said light detector being in a predefined pattern of at least twice per revolution of said impeller means said pattern to provide fluid flow detection through a flow duration imparting less than one revolution to said impeller means.

4. The flow meter of claim 1 wherein said interrupter means is coupled to rotate and interrupt the passage of light from one light source to a light detector at a different time from interruption of the light passage between the other light source and light detector for producing a discrete signal phase differential between opposite rotational directions and in a duration of flow imparting less than one revolution to said impeller.

5. An improved flow meter for measuring the direction and rate of fluid flow within a well bore and of the type having rotation means responsive to find flow and sensing means for detecting rotation, comprising:
   an impeller having a plurality of vanes disposed around a shaft rotatably mounted adjacent said sensing means for rotating in response to fluid flow, said impeller vanes being formed in a helical configuration and secured upon said shaft in opposite directions, said impeller also including a cage, freely suspended within said well bore, said cage enclosing said vanes and wherein said vanes are adjustably axially positionable within said cage for rotation in closer proximity with one end of said cage than the other for engaging laminar fluid therefrom and balancing bidirectional flow sensitivity.

6. An improved flow meter as set forth in claim 5 wherein said cage includes a plurality of ribs longitudinally disposed therearound.

* * * * *

UNITED STATES PATENT AND TRADEMARK OFFICE
CERTIFICATE OF CORRECTION

PATENT NO. : 4,345,480

DATED : August 24, 1982

INVENTOR(S) : Edward R. Basham et al

It is certified that error appears in the above-identified patent and that said Letters Patent is hereby corrected as shown below:

ON THE TITLE PAGE:

Assignee: Gearhart Industries, Inc.
P. O. Box 1936
Fort Worth, Texas 76101 a corporation of the state of Texas

Column 2, line 17 (page 4, line 4), "eror" should be --error--.

Column 4, line 68 (page 9, line 15), "plus" should be --plug--.

Column 6, line 66 (page 13, line 21), "43s" should be --43a--.

Signed and Sealed this

Thirty-first Day of August, 1993

*Attest:*

BRUCE LEHMAN

*Attesting Officer*  *Commissioner of Patents and Trademarks*